United States Patent Office 3,561,968
Patented Feb. 9, 1971

3,561,968
PHOTOREACTIVE TITANIUM DIOXIDE COMPOSITION
Horace Frank Dantro, Toms River, N.J., assignor to National Lead Company, New York, N.Y., a corporation of New Jersey
No Drawing. Continuation-in-part of application Ser. No. 648,954, June 26, 1967. This application May 22, 1968, Ser. No. 731,326
Int. Cl. G03c *1/00*
U.S. Cl. 96—88                    2 Claims

ABSTRACT OF THE DISCLOSURE

This invention relates in general to the preparation of a titanium dioxide composition which possesses photosensitive properties useful in commercial systems designed to respond to exposure to light i.e., photographic emulsions, copy paper and the like.

---

This application is a continuation-in-part of my application Ser. No. 648,954, filed June 26, 1967 now abandoned.

BACKGROUND OF THE INVENTION

Many types of photosensitive materials are used in photographic and copy paper systems. Among these are carbon black and zinc oxide. Carbon black although possessing excellent conductive properties has little or none of the photoreactive properties necessary for use in copy paper systems while zinc oxide although used with limited success has low opacity in copy papers.

Although most commercial grades of titanium dioxide pigment possess a slight amount of photoreactivity, the amount is insufficient to be useful in copy paper systems. However, the particular titanium composition produced by the instant invention is not a pigmentary grade material, but instead, it is specifically designed to have a high degree of photoreactivity and opacity in paper systems and hence is especially useful in the copy paper industry.

SUMMARY OF THE INVENTION

The photoreactive titanium dioxide powder composition of the instant invention has the crystal structure of anatase and comprises finely divided particles having an average individual particle size from 100 to 500 angstroms; a sulfur content calculated as percent S which falls within the range of from 0.03% to 0.3%; possesses a surface area from 60 to 250 sq. meters per gram; a moisture content from 2% to 10% and a photoreactivity, measured by the mandelic acid test, as a change in reflectance of at least 5 units in 2 minutes when exposed to ultraviolet radiation.

This type of photoreactive titanium dioxide powdered composition is prepared by the process of the instant invention which comprises: hydrolyzing a titanium sulfate-iron sulfate solution to form hydrous titanium oxide, filtering, bleaching and washing said hydrous oxide, to remove the soluble iron salts therefrom, said bleached hydrous oxide being substantially iron free but containing from 5% to 15% $H_2SO_4$ associated with said hydrous oxide, forming an aqueous slurry of said bleached hydrous oxide, treating said slurry with a sufficient amount of an ammoniacal compound selected from the group consisting of ammonium hydroxide, ammonium carbonate, and ammonia gas to raise the pH of said slurry to at least 6.0, washing said neutralized hydrous oxide to remove substantially all of the ammonium sulfate formed, drying said washed hydrous oxide at 250° C.–700° C. to form soft aggregates of crystals of titanium dioxide having an average individual particle size which falls within the range of from 100 to 500 A. and grinding said aggregates to a fine powder.

DESCRIPTION OF THE PREFERRED EMBODIMENT

Before further describing the instant invention, it is desirable to define what is meant by "photoreactivity." A photoreactive material is one which will react in a light sensitive system and in particular a copy paper system to form an image when exposed to ultraviolet illumination.

In the instant invention the titanium dioxide compositions obtained were tested for photoreactivity and found to meet certain standards which have been selected as being commercially useful.

These tests and their standards are described as follows.

MANDELIC ACID TEST OF PHOTOREACTIVITY OF TITANIUM DIOXIDE MATERIALS 10 g. of the titanium composition are mixed with a sufficient amount of aqueous 0.5 M mandelic acid solution to form a soft paste. The paste is placed upon a microscope slide glass plate (5 in. x 5 in. 1 mm.), covered with a thick glass plate (5 in. x 5 in. double strength window glass), and pressed to distribute the paste over an area about 3 inches in diameter, microscope slides (1 in. x 3 in. x 1 mm.) are used between the plates as spacers. The edges of the plates are bound together with 1 inch tape to prevent evaporation. The initial reflectance of the paste through the microscope slide glass plate is measured by means of a Colormaster Differential Colorimeter with the green filter. The plates are placed on a rotating turntable, microscope slide glass plate uppermost, underneath three sunlamps (275 watts) arranged in an equilateral triangle 13 inches from center to center and approximately 13 inches above the turntable. Before each run the ultraviolet intensity of each lamp is measured and weak lamps are replaced. Reflectance measurements are made of the pastes at suitable intervals and the change in reflectance with time is determined. This figure is a measure of the photoreactivity of the titanium composition. A change in reflectance of at least 5 units in 10 minutes is required as the minimum for producing acceptable images in paper coating systems, photographic emulsions and similar commercial applications.

The hydrous titanium oxide used in the process of the instant invention may be prepared from any of the well-known hydrolysis methods described in the prior art. In such processes a titanium sulfate-ferrous sulfate solution is formed by digesting a titaniferous iron ore in concentrated sulfuric acid to form a so-called "digestion cake" which is dissolved in water or weak acid. Such a solution after clarifying and concentrating is then subjected to hydrolysis by diluting and boiling to precipitate the titanium values. The hydrous titanium oxide formed is then washed and bleached to remove the ferrous sulfate and other coloring impurities. Such a hydrous titanium oxide even after thorough washing contains from 5% to 15% $H_2SO_4$ combined or adsorbed in the composition.

In order to prepare the composition of the instant invention it is necessary to reduce the amount of $H_2SO_4$ present in the hydrous oxide to this end. Ammonia gas, ammonium hydroxide or ammonium carbonate is added to a slurry of the hydrous titanium oxide to form ammonium sulfate which can be readily removed by washing. The amount of ammonium compound added is the amount necessary to raise the pH of the hydrous titanium oxide slurry to at least 6.0. Raising the pH to above 8.0 does not further improve the product but merely adds to the cost of the process.

After adding the appropriate amount of ammonium compound, the hydrous titanium oxide is then deliquored and washed until the percentage of sulfate in the dried product is reduced to below 0.3%, calculated as S on a dried titanium dioxide weight basis.

After washing, the neutralized hydrous oxide is then dried at a temperature from 250° C. to 700° C. until the average particle size of the titanium dioxide crystal falls within the range of from 100 to 500 angstroms. The dried product is then ground to break up the soft aggregates which form during the drying step.

The ground product is then analyzed to obtain the various properties.

The average particle size is determined by X-ray diffraction analysis.

The moisture content of the product is determined by heating 1 gram sample of the product at 750° C. for 1 hour and determining the loss in weight.

A more detailed description of the instant invention is presented in the following examples.

Example 1

A hydrous titanium dioxide was prepared by adding a titanium sulfate-ferrous sulfate solution to hot water and boiling the mixture. The titanium sulfate solution used had the following analysis:

$TiO_2$—250 g.p.l.
$H_2SO_4$—500 g.p.l.
$FeSO_4$—169 g.p.l.
$H_2SO_4/TiO_2$—2.0
Spec. gravity—1.675 at 60° C.

3000 ml. of this titanium solution heated to 96° C. were added to 750 ml. water heated to 96° C. within a period of 16 minutes. The entire mixture was then heated to boiling and boiled for 3 hours to complete the hydrolysis. 790 ml. of hot water were added to the mixture to cut the concentration to 165 g.p.l. $TiO_2$.

The resulting hydrous titanium oxide was filtered, washed free of soluble iron salts, bleached with 10% $H_2SO_4$ and 0.1% aluminum metal for 1 hour at 80° C. at 20% solids, then filtered and washed with water until iron free. The washed filter cake contained 10% $H_2SO_4$, calculated on a $TiO_2$ basis. 2143 grams of the filter cake containing 35% solids were admixed with 1607 ml. water to form a slurry containing 20% solids. With agitation 159 grams of ammonium hydroxide diluted with 178 ml. water were added to the hydrous oxide slurry at 60° C. to raise the pH of the slurry to 7.1.

The neutralized solids were filtered and the solids were washed with 15 liters water and then dried at a temperature of 350° C. for 1½ hours as a consequence of which the moisture content of the material was reduced to 6.2%. The dried material was then steam milled.

The dried and milled titanium dioxide composition had the following properties:

$H_2O$—6.2%
S—0.11%
Average particle size—177 A.
Surface area—>200 m.²/g.
Reflectance loss in 2 min.—26
Reflectance loss in 10 min.—38

The operational details and results obtained are also recorded in the following table.

This photoreactive titanium dioxide composition was used in aqueous copy paper system and an excellent image was obtained.

Example 2

In this run the procedure of Example 1 was repeated except that the pH of the slurry was raised to 6.3. The operational details and the results obtained are recorded in the following table along with those of Example 1.

This product also produced an excellent image in a copy paper system.

Examples 3–4

These runs were carried out as controls using the procedure of Example 1 except that the amount of ammonium hydroxide used was less than that required to raise the pH of the slurry to 6.0. In Example 3 the pH was raised only to 5.5 while in Example 4 none of the $H_2SO_4$ was neutralized. The results are recorded in the table. These titanium dioxide products contained excessive amounts of sulfur and water. The pH was also too low on both products. When used in copy paper, the images were of poor quality.

Examples 5–10

In these runs the procedure of Example 1 was repeated except that the neutralized hydrous titanium oxides were dried at various temperatures, i.e. from 280° C. to 650° C. All of these products were useful in preparing images. The operational details and results obtained are recorded in the table.

Examples 11–12

In these runs the procedure of Example 1 was used except that ammonia gas and ammonium carbonate were used in place of ammonium hydroxide. In both of these examples the products obtained were substantially identical to product obtained in Example 1.

TABLE

| EXAMPLE NO. | 1 | 2 | 3 | 4 | 5 | 6 | 7 | 8 | 9 | 10 |
|---|---|---|---|---|---|---|---|---|---|---|
| pH of neutralized slurry | 7.1 | 6.3 | 5.5 | 2.3 | 7.1 | 7.1 | 7.1 | 7.1 | 7.1 | 7.1 |
| Drying temp., ° C | 350 | 350 | 350 | 350 | 280 | 320 | 380 | 450 | 550 | 650 |
| Drying time, hrs. | 1½ | 1½ | 1½ | 1½ | 1½ | 1½ | 1½ | 1½ | 1½ | 1½ |
| Percent S | 0.11 | 0.29 | 0.92 | 1.8 | 0.11 | 0.13 | 0.13 | 0.12 | 0.11 | 0.11 |
| Percent moisture | 6.2 | 6.8 | 12.4 | 17.6 | 9.0 | 6.8 | 5.7 | 4.7 | 4.1 | 3.1 |
| Surface area, m.²/g. | >200 | >175 | >175 | >175 | >175 | >175 | >175 | >150 | >115 | >83 |
| Avg. part. size, A | 177 | 163 | 114 | 84 | 137 | 149 | 195 | 233 | 245 | 357 |
| Loss in reflectance in 2 min. | 26 | 22 | (¹) | (¹) | 20 | 16 | 15 | | 8 | 13 |
| Loss in reflectance in 10 min. | 38 | 44 | | | 39 | 34 | 37 | 37 | 32 | 36 |

¹ Poor quality print.

Although images of high quality are produced by using the photoreactive titanium dioxide compositions of the instant invention, the image quality may be somewhat improved when the photoreactive titanium dioxide powder composition of the instant invention is coated with a variety of metal oxide compounds.

It has been found that coatings of one or more of the following metal oxides are particularly useful: lead oxide, bismuth oxide, zinc oxide, titanium oxide, silicon oxide and aluminum oxide.

The amount of the metal oxide coating on the titanium dioxide powdered composition should be from 0.02% to 2.0% metal oxide based on the weight of the $TiO_2$ composition.

The metal oxide coating is applied by forming a water slurry of the titanium dioxide composition, adding to the slurry a soluble metal salt and precipitating the hydrous oxide of the metal on to the surface of the titanium dioxide composition. The coated composition is then dried and ground.

The following examples are presented to show further the method by which the coatings are applied.

Example 13

400 grams of the powdered titanium dioxide composition prepared in Example 1 were slurried in water to 23% solids and to the slurry was added lead acetate solution in amount to yield 0.2% PbO on a TiO₂ basis. After thoroughly agitating the mixture, the slurry was treated with NH₄OH in amount to obtain a slurry pH of 7.5, to precipitate the lead as the hydrous oxide. The pH of the slurry was then maintained at 7.5 for 1 hour. The slurry was then deliquored and the filter cake was thoroughly washed with water to remove the soluble salts. The washed cake was then dried and ground.

In order to show the effectiveness of the coating on the titanium dioxide powder composition of the instant invention, images on a substrate were prepared using the non-coated product of Example 1 and the coated product of Example 13.

The images were prepared by admixing the titanium dioxide composition with water and a polyacrylate and coating a substrate with the mixture. The coating on the substrate was exposed then subjected to a redox reaction to develop the image. Details of preparing the image are similar to that described in French Pat. No. 1,482,724, issued to the Itek corporation.

The image properties were determined as maximum optical density and speed using the method described by the American Standards Association in a bulletin entitled: "American Standard Sensitometry of Photographic Papers" Mar. 17, 1966.

Using the non-coated composition of Example 1, the image obtained had a maximum optical density of 0.8 with a speed of 16. When an image was prepared using the coated product of Example 13, the maximum optical density was increased about 25% without reducing the speed.

Examples 14–19

The procedure of Example 13 was repeated using various agents for forming the metal oxide coatings. Chorides of bismuth, titanium, aluminum, silicon and zinc were added to form the respective metal oxide coatings on the titanium dioxide composition. In Example 17 a mixture of bismuth and titanium chloride was employed while in Example 18 sodium metasilicate was added as the source of SiO₂. The agents used and the amounts employed are recorded as follows:

| Example Number: | Salt used | Metal oxide obtained | Amount oxide, percent |
|---|---|---|---|
| 14 | BiCl₃ | Bi₂O₃ | 0.2 |
| 15 | TiCl₄ | TiO₂ | 0.2 |
| 16 | ZnCl₂ | ZnO | 0.2 |
| 17 | BiCl₃+TiCl₄ | Bi₂O₃+TiO₂ | 0.2+0.2 |
| 18 | Na₂SiO₃ | SiO₂ | 0.2 |
| 19 | AlCl₃ | Al₂O₃ | 0.2 |

When images were prepared using these coated compositions, the image intensities were increased from 10% to 25% over the images obtained using the non-coated product without reducing the speed.

While this invention has been described and illustrated by the examples shown, it is not intended to be strictly limited thereto, and other variations and modifications may be employed within the scope of the following claims.

I claim:

1. Photoreactive titanium dioxide powder composition having the crystal structure of anatase comprising finely divided particles having an average individual particle size from 100 to 500 angstroms; a sulfur content calculated as percent S which falls within the range of from 0.03% to 0.3%; a surface area from 60 to 250 sq. meters per gram; a moisture content from 2% to 10% and a photoreactivity, measured by the mandelic acid test, as a change in reflectance, of at least 5 units in 2 minutes when exposed to ultraviolet radiation.

2. Photoreactive titanium dioxide powder composition having the crystal structure of anatase comprising finely divided particles having an average individual particle size from 100 to 500 angstroms; a sulfur content calculated as percent S which falls within the range of from 0.03% to 0.3%; a surface area from 60 to 250 sq. meters per gram; a moisture content from 2% to 10% and a photoreactivity, measured by the mandelic acid test, as a change in reflectance of at least 5 units in 2 minutes when exposed to ultraviolet radiation, said composition having a metal oxide coating selected from the group consisting of PbO, Bi₂O₃, TiO₂, ZnO, SiO₂, Al₂O₃ and mixtures thereof, the amount of said coating being from 0.2% to 2.0% metal oxide based on the weight of said titanium dioxide composition.

References Cited

UNITED STATES PATENTS 2,817,595   12/1957   Kalinowski _____ 106—300
3,380,823   4/1968    Gold _____ 96—88

FOREIGN PATENTS 567,934   3/1945   Great Britain _____ 23—202

OTHER REFERENCES

McTaggart, F. K. and Bear J.: J. Appl. Chem., Dec. 5, 1955, p. 643 (646), Phototropic Effects in Oxides, I. Titanium Dioxide.

NORMAN G. TORCHIN, Primary Examiner

J. L. GOODROW, Assistant Examiner

U.S. Cl. X.R.

23—202; 96—90; 252—501